Dec. 30, 1958 S. DOBROSAVLJEVIĆ 2,866,656
MECHANICAL SEAL BETWEEN ROTARY AND COAXIAL MECHANICAL MEMBERS
Filed March 19, 1954 2 Sheets-Sheet 1
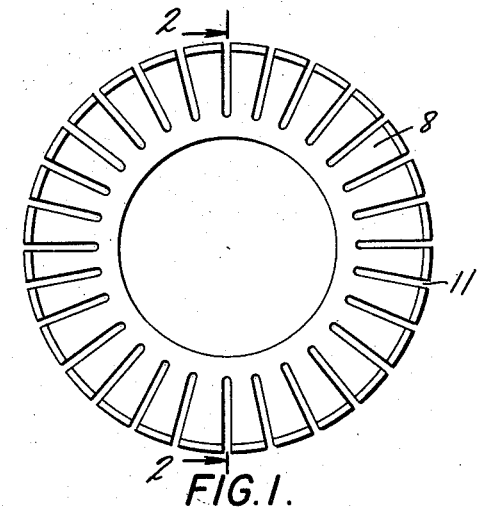
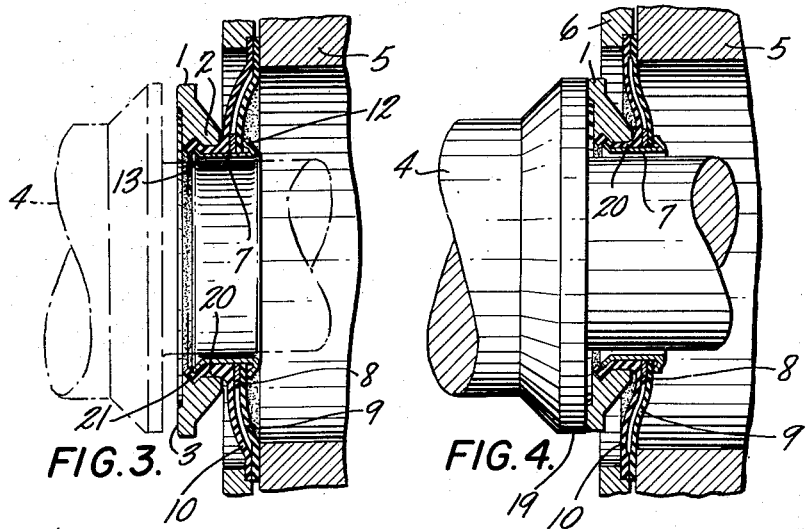
INVENTOR.
STOYMIR DOBROSAVLJEVIĆ
BY
ATTORNEY.

Dec. 30, 1958   S. DOBROSAVLJEVIĆ   2,866,656
MECHANICAL SEAL BETWEEN ROTARY AND COAXIAL MECHANICAL MEMBERS
Filed March 19, 1954   2 Sheets-Sheet 2

INVENTOR.
STOYMIR DOBROSAVLJEVIĆ
BY
ATTORNEY.

United States Patent Office 2,866,656
Patented Dec. 30, 1958

2,866,656

MECHANICAL SEAL BETWEEN ROTARY AND COAXIAL MECHANICAL MEMBERS

Stoymir Dobrosavljević, Paris, France, assignor to International Engineering General Research & Licensing Company, a corporation of Delaware Application March 19, 1954, Serial No. 417,360

Claims priority, application France May 22, 1953

7 Claims. (Cl. 286—11.14)

This invention relates to a mechanical sealing device and is more particularly concerned with a sealing device of the diaphragm type for preventing the passage of liquid between two coaxial machine parts while permitting the relative rotational movement of these parts, one of which is a shaft provided with means defining a surface perpendicular to the axis of the shaft. This perpendicular surface, which will be referred to hereafter as the "supporting surface," remains continuously in contact with one of the elements of the sealing device.

It is an object of this invention to provide a shaft sealing device of the character indicated which is unaffected by the numerous adverse influences arising during manufacture or assembly, as well as those arising as a result of the operating conditions of the machines with which the device is employed.

Another object of this invention is to provide a shaft sealing device having a friction ring which exerts against the supporting surface of the shaft a specific pressure which is fairly constant and is independent of variations in the pressure of the fluid, thus making possible a balance of the pressures exerted on it by the fluid to be sealed which will insure perfect sealing both in the case of high and variable pressures of the fluid as well as high and variable speeds between the coaxial members with which the seal is used.

It is also an object of the invention to reduce to a minimum the number of components in the sealing device, and to give these components a structure such that they do not take up much room and are easy to manufacture.

It is also one of the objects of the invention to provide a shaft sealing device which is adapted to tolerate, within wide limits, the geometric and dimensional variations produced by slight imperfections which are inevitable in the manufacture and assembly of the various elements in the machine with which the sealing device is used. In the device of the invention no elastic elements with helicoidal springs are employed.

It is also one of the objects of the invention to provide a sealing device which is resistant to all axial and transverse vibrations which inevitably arise in a machine upon rotation of the shaft.

It is also one of the objects of the invention to provide a construction which prevents any adverse influence from the sonic and ultrasonic vibrations resulting from friction between the friction ring and the supporting surface of the shaft. To this end a supple and impermeable diaphragm is interposed in the assembly between the friction ring and the elastic element. For the same reason the securing of the entire device along its outer circumference is effected by means of this supple and impermeable diaphragm.

It is also one of the objects of the invention to provide a rugged and compact shaft sealing device which does not require special tools nor special manual labor for its correct assembly, and which can be easily assembled without error, so that it can be easily disassembled and reassembled as required.

The essential object of the present invention is the provision of a mechanical sealing device in which the functions of elasticity and of tightness are separated. According to the invention there is employed an annular elastic and convex element which has the shape of a bottom-less dish and comprises a number of equidistant radial slits extending from the outer circumference towards the center, this element is mounted integrally with at least one annular diaphragm, which is tight and flexible and hugs or envelopes the same, the diaphragm having the same internal diameter as the elastic element but a larger outer diameter in order to permit the securing of the assembly along its outer circumferences to a member of the machine.

According to the invention, each diaphragm is secured integrally with the annular elastic element to a friction tight ring on the side opposite its friction or abutment face, this securing being effected by means of an assembling ring.

Moreover, according to the invention, that part of the diaphragm which covers the convex side of the elastic element comprises, on the same side and on its inner edge, a coaxial sleeve adapted to be lodged in the bore of the friction ring and to be seated there in an interval groove of this bore by the doubling back of the edge of the aforesaid assembling ring.

The sealing device thus formed, and consisting substantially of the elastic annular convex element with radial slits, the tight diaphragm or diaphragms which hug this element and protect the same, and a friction tight ring the inner edge of which protrudes concentrically at the back of the abutment or friction face of the ring, is a new industrial product.

According to the invention, the aforesaid sealing device may further include a conical auxiliary ring which is adapted to insure tight securing, to a part of a machine, of the deformable diaphragm by means of its outer rim. When the auxiliary ring is used, the rim of the diaphragm has the shape of a sleeve with a conical and inner surface.

Other characteristics and advantages of the present invention will appear in the course of the description hereinafter and from the accompanying drawings which show diagrammatically and by way of example only several embodiments of the invention.

In the drawings,

Fig. 1 is an end elevational view showing the face of the annular elastic element with radial slits used in the device forming the subject of the present invention;

Fig. 2 is a section along 2—2 of Fig. 1;

Figs. 3 and 4 are sectional views of a first embodiment, of a sealing device according to the invention, showing the device before and after being set in service position, respectively;

Figures 5, 6:
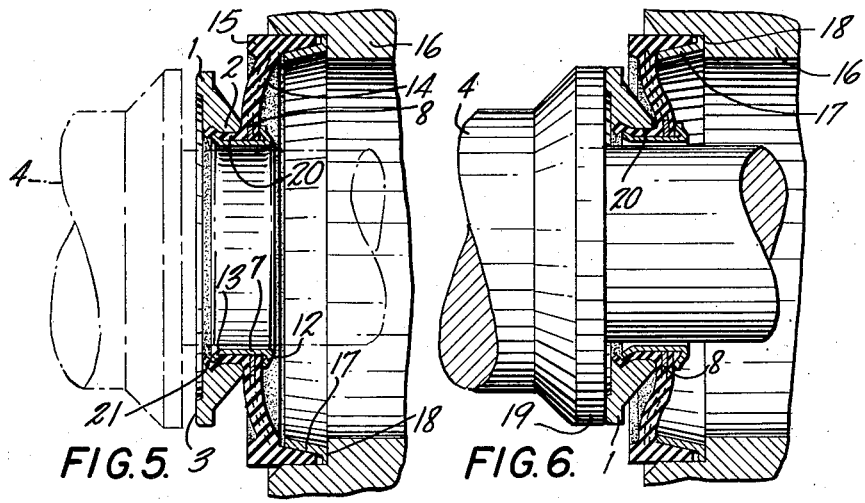
Figs. 5 and 6 are views similar to Figs. 3 and 4 but relating to a second embodiment.

In the embodiment according to Fig. 3 an annular abutment ring or friction tight ring 1 is used which comprises on one of its faces and on its inner edge a concentric projection 2, and on its other face a plane surface of abutment or friction 3 designed to come into tight contact, as shown in Fig. 4, with a plane machined face, such as a collar 19 of a shaft 4, rotating in the interior of the coaxial bore provided in another part 5 of a machine.

The concentric projection 2 of annular ring 1 is mounted on an assembly sleeve 7 together with the assembly which insures elasticity and tightness, which assembly is formed, in the embodiment represented, by an elastic element 8 enclosed between two flexible, tight diaphragms 9 and 10. The elastic element 8 is of the type shown in Figs. 1 and 2; it is formed by a piece of elastic material, preferably of metal, which has substantially the shape of a bottom-less dish (as seen in Fig. 2) and comprising radial slits 11.

The two tight diaphragms 9 and 10 of flexible material are disposed on both sides of the elastic element 8, and their outer rims are clamped between the part 5 of the machine and a fixing ring 6 which may be clamped against the part 5 by any suitable means, such as bolts or the like.

As will be seen particularly from Fig. 3, for the purpose of mounting, the convex portion of the elastic element 8 is turned towards the side of the concentric projection 2 of the ring 1.

The assembly sleeve 7 comprises at its right hand end a collar 12 against which abuts the inner edge of the elastic element 8, thus squeezing the inner edge of the diaphragm 9.

The inner edge of the diaphragm 10 comprises a sleeve 20 which is held between the assembly sleeve 7 and the bore of the ring 1. This bore comprises a groove 21, into which engages the end of the sleeve 20 when a setting pressure is applied to the sleeve 7 for the purpose of effecting a radial flaring of the edge 13. In view of the manner of assembling applied, it is necessary that the diaphragm 10 be clamped moderately against the right hand internal edge of the ring 1, in order that the assembly 8, 9, 10 will not detach itself from the collar 12 of the assembly sleeve 7 under the action of the pressure prevailing on the right or left side of the assembly 8, 9, 10.

The piece 4 which is designed to rotate in the bore 5 is then fitted into its place in such manner that the face of its abutment collar 19 bears against the tight friction face 3 of the ring 1 (Fig. 4).

The position shown in Fig. 4 represents the middle operative position, from which oscillations to the left and to the right may take place, the ring 1 abutting against the face of the collar 19 of the shaft 4 under the action of the elastic pressure of the elastic element 8; during all these movements, whether they are axial or slightly angular, tightness is assured, and it will be seen that in this device the function of elasticity is assured substantially by the elastic element 8 while the function of tightness is assured by the flexible tight diaphragms 9 and 10, thus overcoming the difficulties of prior constructions.

The two flexible tight diaphragms 9 and 10 can be made of any appropriate flexible material resistant to the pressure and the temperature of the fluid and to the corrosive and chemical action, if any, of the fluid. They may for example consist of rubber, natural or synthetic, of a suitable plastic material or of thin metal foil.

Figs. 5 and 6 are views of modifications, in which in particular the elastic element 8 is completely embedded in the flexible tight diaphragm 14, this embedment being carried out at the time of moulding the piece 14.

In the embodiment according to Figs. 5 and 6, the flexible, tight diaphragm 14 is provided at its outer edge with a sleeve 15 the internal coaxial surface of which is conical; for the mounting in the part 16 of the machine a blocking ring 17 is used which has an outer surface which has a conicity corresponding to that of the internal conicity of the sleeve 15, this ring 17 being adapted to abut against the bottom 18 of a cylindrical counterbore provided in the part 16 of the machine.

It will be seen that the pressure of the fluid which acts on the diaphragm from the side of the ring 1, owing to the conicity of the outer surface of the ring 17 and of the internal conicity of the sleeve 15, has the effect of clamping the sleeve 15 between the ring 17 and the bore provided in the part 16 of the machine, the clamping action increasing as the pressure increases.

Moreover, the elastic reaction effected by the elastic element 8 when the device is in the operative position tends to drive the sleeve 15, wedgefashion, between the bore of the component 16 and the blocking ring 17; the rim of the diaphragm 14 is thus securely held.

It will also be seen that the mounting of the sealing device is very simple, and that it suffices for the user of this sealing device to provide a cylindrical counter bore in the part 16 of the machine for placing therein the ring 17, and subsequently inserting the sleeve 15 of the flexible tight diaphragm 14.

Fig. 5 shows the sealing device simply mounted in the part 16, and before the fitting of the rotary component 4 with respect to which the tightness is to be established.

Fig. 6 shows the same device after the fitting in position of the rotary component 4, and shows this sealing device in the middle position of operation as in the case of Fig. 4.

Figure 10:
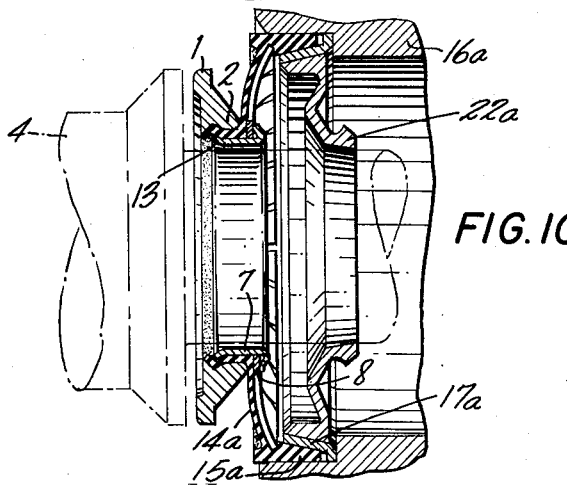
Fig. 10 is a sectional view corresponding to Fig. 9 but showing the use of a single radially-slit annular elastic element.

It will be understod that, if it is deemed opportune, the elastic element 8 may be covered on its convex side only by the flexible tight diaphragm as shown in Fig. 10.

Figures 7, 8, 9:
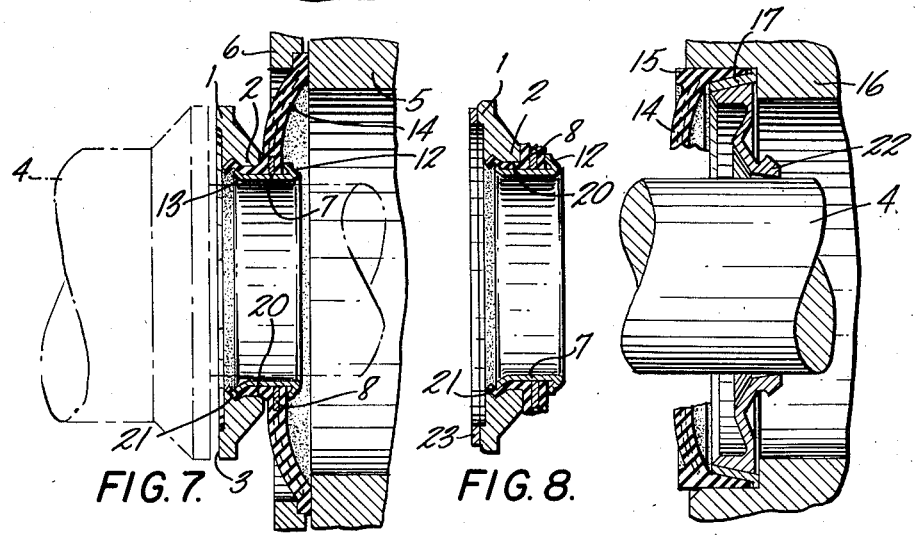
Fig. 7 is a view similar to Figs. 3 and 5 but relating to another embodiment of the invention.
Fig. 8 is a partial sectional view of a modified embodiment of the invention.
Fig. 9 is a sectional view corresponding to Fig. 5 wherein the sealing device is supplemented by a member protecting it against infiltration of impurities toward the abutment face of the annular sealing and friction ring.

In the embodiment of Fig. 7 there is an arrangement similar to that of Fig. 5, that is to say, an arrangement in which the elastic element 8 is embedded in the material forming the flexible tight diaphragm 14. The only difference in this embodiment is that the outer circumference of this diaphragm does not comprise the sleeve 15, and may be simply clamped between the part 5 of the machine and the fixing ring 6, as in the case of the embodiment of Figs. 3 and 4.

Fig. 7 shows the sealing device in the position which it occupies before the fitting in place of the rotary member 4, with respect to which the tightness is to be established.

When member 4 is put into its place, the sealing device occupies a middle position of operation similar to that which is shown for the two embodiments described hereinabove with reference to Figs. 4 and 6.

In Fig. 8, a modification of the embodiment of the ring 1 has been shown in which a ring 23, made of a material assuring a good friction surface, is provided when the ring 1 is not itself made of a material offering the best friction qualities required. According to the material employed, ring 23 is brazed, soldered or cemented to the ring 1.

In Fig. 9, a part of the embodiment according to the Figs. 5 and 6 is shown supplemented by an elastic, flexible annular member 22 the outer rim of which is fixed (for example by cementing when moulding) in the bore of the blocking ring 17 and the inner edge of which forms a scraper acting on the shaft 4 in order to prevent any of the fluid on the right hand side of the sleeve 22 from passing to the left side of this sleeve and infiltrating between the friction or abutment face of the ring 1 and the shoulder 19 of the shaft 4 against which abuts ring 1, which would tend to destroy the tightness of the sealing device.

From the description of this sealing device in its various embodiments, given merely by way of example, it is evident that by reason of the members 9, 10 and 14 the tightness and the firm securing of the device is assured, while the elastic ring 8 insures elasticity and elastic stability as well as resistance against any possible mechanical load while in service.

The members 9, 10 and 14 insure at the same time the protection of the elastic element 8 against all corrosive and chemical action.

Further, it is evident that according to the embodiments shown in Figs. 5, 6 and 9 using the sleeve 15 and the conical blocking ring 17, the mounting of the sealing of the sealing device is greatly simplified.

It is also evident that in all these cases the elastic element 8 is not clamped along its outer circumference.

It should be noted, besides, that if desired, instead of providing a single elastic element 8 as indicated in the embodiment, described hereinabove, a predetermined number thereof may be superimposed (to provide a varying thickness) in accordance with the elastic characteristics desired.

What I claim is:

1. A fluid-tight shaft assembly comprising a shaft and a machine having a bore into which said shaft extends, said shaft having means providing a radial surface, a mechanical sealing device surrounding said shaft, said device comprising at least one elastic annular element formed with radial slits, said element having a convex side and a concave side, means closely enclosing and protecting both radial faces of said element, said last-named means comprising at least one flexible tight diaphragm, an annular ring having on one face a friction tight bearing surface bearing against said radial surface and provided on its other face along the inner edge of said ring with a protruding concentric part, and an assembling sleeve holding together in closely adjacent relationship the radially inner edges of said elastic element, said tight diaphragm and said annular ring, a blocking ring having a conical external surface, said blocking ring being receivable in said bore and said diaphragm being formed with a peripheral sleeve portion having a coaxial internal conical surface, said peripheral sleeve portion being received between the surface of said blocking ring and the surface of said bore.

2. A mechanical sealing device as defined in claim 1, further comprising a flexible and tight auxiliary annular element having an outer edge tightly inserted in the bore of the blocking ring, said auxiliary annular element having an inner edge forming a scraper acting on said shaft, said auxiliary element preventing the infiltration of impurities between the bearing surface of the annular ring and the surface against which said ring abuts.

3. A fluid-tight shaft assembly comprising a shaft and a machine having a bore into which said shaft extends, said shaft having means providing a radial surface, a mechanical sealing device surrounding said shaft, said device comprising at least one elastic annular element formed with radial slits, said element having a convex side and a concave side, means closely overlying and protecting at least one radial face of said element, said last-named means comprising at least one flexible tight diaphragm, an annular ring having on one face a friction tight bearing surface bearing against said radial surface and provided on its other face along the inner edge of said ring with a protruding concentric part, and an assembling sleeve holding together in closely adjacent relationship the radially inner edges of said elastic element, said tight diaphragm and said annular ring, a blocking ring having a conical external surface, said blocking ring being receivable in said bore and said diaphragm being formed with a peripheral sleeve portion having a coaxial internal conical surface, said peripheral sleeve portion being received between the surface of said blocking ring and the surface of said bore.

4. A mechanical sealing device as defined in claim 3, wherein the radial slits provided in the elastic element extend from the outer edge of the elastic annular element towards the center thereof.

5. A mechanical sealing device as defined in claim 3, wherein the flexible and tight annular diaphragm has the same internal diameter as said elastic element but a larger outer diameter than that of said element.

6. A mechanical sealing device for use between relatively-rotatable coaxial mechanical members one of which is cylindrical and has means defining a radial surface, comprising, in combination, at least one elastic annular element formed with slits extending radially inwardly from its outer periphery but terminating short of the inner periphery of said annular element, said annular element having a convex side and a concave side, means closely overlying and protecting at least one of said sides of said annular element, said last-named means comprising at least one flexible tight diaphragm, an annular ring having on one radial face a friction tight bearing surface bearing against said radial surface and being provided with a protruding concentric ridge on its other radial face along the inner periphery of said ring, and an assembling sleeve holding together in closely adjacent relationship the radially inner edges of said elastic element, of said flexible tight diaphragm and of said annular ring, said flexible tight diaphragm being formed on the convex side of said element with an annular sleeve portion which is disposed between the assembling sleeve and the radially-inner surface of said annular ring.

7. A fluid-tight shaft assembly comprising a shaft and a machine having a bore into which said shaft extends, said shaft having means defining a radial surface, a mechanical sealing device surrounding said shaft, said device comprising, in combination at least one elastic annular element formed with slits extending radially inwardly from its outer periphery but terminating short of the inner periphery of said annular element, said annular element having a convex side and a concave side, means closely overlying and protecting at least one of said sides of said annular element, said last-named means comprising at least one flexible tight diaphragm, an annular ring having on one radial face a friction tight bearing surface bearing against said radial surface and being provided with a protruding concentric ridge on its other radial face along the inner periphery of said ring, and an assembling sleeve holding together in closely adjacent relationship the radially inner edges of said elastic element, of said flexible tight diaphragm and of said annular ring, said flexible tight diaphragm being formed on the convex side of said element with an annular sleeve portion which is disposed between the assembling sleeve and the radially-inner surface of said annular ring.

References Cited in the file of this patent

UNITED STATES PATENTS

| | | |
|---|---|---|
| 2,156,719 | Berger | May 2, 1939 |
| 2,279,669 | Friskney | Apr. 14, 1942 |
| 2,308,114 | Schjolin | Jan. 12, 1943 |
| 2,434,589 | Roth | Jan. 13, 1948 |
| 2,489,212 | Zwack | Nov. 22, 1949 |
| 2,560,557 | Curtis | July 17, 1951 |
| 2,584,679 | Dobrosavljevic | Feb. 5, 1952 |
| 2,672,360 | Chambers et al. | Mar. 16, 1954 |

FOREIGN PATENTS

| | | |
|---|---|---|
| 1,058,810 | France | Nov. 10, 1953 |